(12) United States Patent
Malin et al.

(10) Patent No.: US 6,648,279 B1
(45) Date of Patent: Nov. 18, 2003

(54) DROP WIRE CLAMP AND METHOD FOR SECURING DROP WIRE

(75) Inventors: Glen K. Malin, New York, NY (US); David Wolf, Newton, MA (US)

(73) Assignee: Allied Bolt, Inc., Hollis, NY (US)

( * ) Notice: Subject to any disclaimer, the term of this patent is extended or adjusted under 35 U.S.C. 154(b) by 170 days.

(21) Appl. No.: 09/723,849

(22) Filed: Nov. 28, 2000

(51) Int. Cl.⁷ .................................................. F16L 3/08
(52) U.S. Cl. .......................... 248/65; 174/44; 24/115 R
(58) Field of Search ........................... 248/51, 52, 68.1, 248/74.3, 65; 24/306, 298, 136 R, 115 M, 136 L, 135 R, 115 R, 115 K, 129 A, 129 R; 403/314, 368, 374.2, 73, 211; 604/179; 174/44, 155; D8/394

(56) References Cited

U.S. PATENT DOCUMENTS

| | | | | |
|---|---|---|---|---|
| 1,793,140 A | * | 2/1931 | Steinmayer | 24/135 R |
| 2,113,702 A | * | 4/1938 | McKesson | 248/51 |
| 2,781,212 A | * | 2/1957 | Jugle | 24/115 M |
| 3,211,829 A | | 10/1965 | Braugtigam | |
| 3,266,760 A | * | 8/1966 | Edelman | 248/51 |
| 3,629,909 A | | 12/1971 | Riley | |
| 3,960,461 A | | 6/1976 | Sachs | 403/368 |
| D260,730 S | | 9/1981 | Fujita | |
| 4,438,293 A | | 3/1984 | Voser | 174/79 |
| 4,461,059 A | | 7/1984 | Bury | |
| 4,477,948 A | | 10/1984 | Sachs | 24/115 R |
| 4,496,212 A | | 1/1985 | Harvey | 350/96.2 |
| 4,939,821 A | | 7/1990 | Frank, Jr. | |
| 5,142,745 A | * | 9/1992 | Setty et al. | 24/136 R |
| 5,209,439 A | | 5/1993 | Coll | 248/65 |
| 5,322,132 A | | 6/1994 | Franks, Jr. | |
| 5,398,895 A | * | 3/1995 | Whetherhult et al. | 248/51 |
| D390,016 S | | 2/1998 | Beverly | |
| 6,247,211 B1 | * | 6/2001 | Bell | 24/306 |
| D454,483 S | | 3/2002 | Wolf | |

OTHER PUBLICATIONS

Diamond Communications Inc./Sachs Communications Inc./South River Inc., *Applications, Coaxial Messenger Cable Drop Clamp SC02MFA–SS*, 1996, pp. 116–119.

* cited by examiner

*Primary Examiner*—Gwendolyn Baxter
(74) *Attorney, Agent, or Firm*—Baker Botts LLP

(57) ABSTRACT

A drop wire clamp for securing a drop wire having a messenger strand and a support wire and a method for securing the drop wire and for transferring the load of the drop wire to a support structure is provided. The clamp uses a helical spiral and an anchor for engaging and securing the drop wire. The support wire may be placed into the channel defined by the helical spiral by inserting the drop wire through an open end of the channel, by weaving the drop wire into openings between coils of the helical spiral or by deforming a malleable segment of the clamp to shape and form a helical spiral around the support wire. The clamp with engaged drop wire is fixed and supported to a support structure so that at least part of the load of the drop wire transfers to the structure.

24 Claims, 4 Drawing Sheets

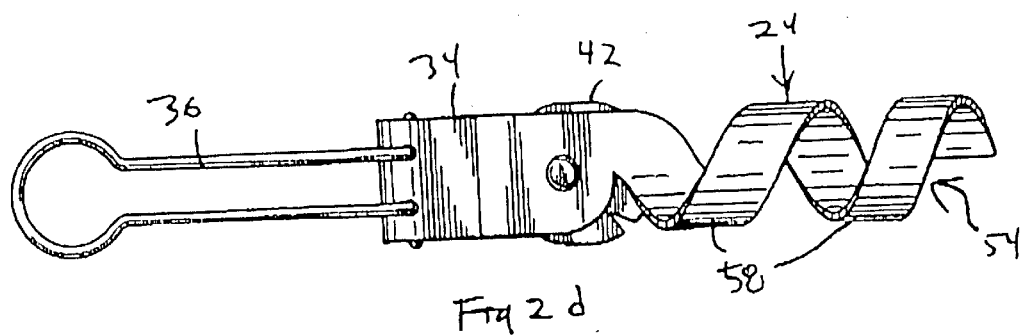
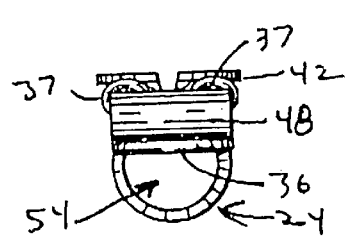
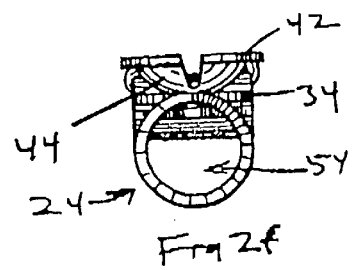
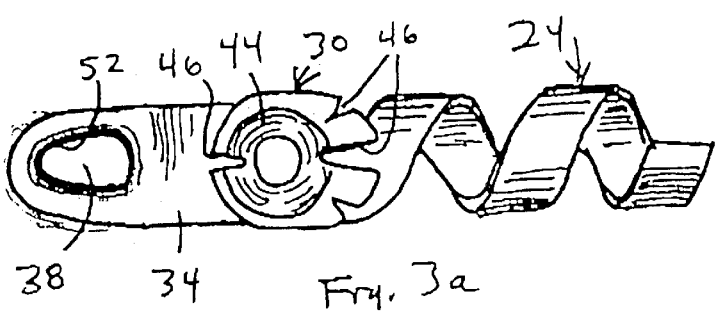
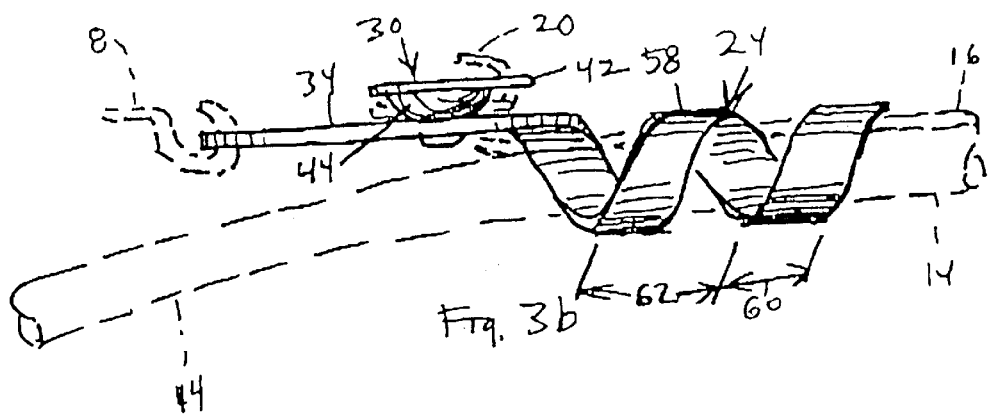

DROP WIRE CLAMP AND METHOD FOR SECURING DROP WIRE

FIELD OF THE INVENTION

The invention relates to a device and method for securing a drop wire having a messenger strand and a support wire to a support structure.

DESCRIPTION OF THE RELATED ART

The present invention relates to a device and method for securing and supporting a segment of cable TV cable, usually having a signal carrying or messenger strand and a load-bearing or support wire.

The device, commonly referred to as a drop wire clamp, may be used to accept the segment of cable from a tower or pole to the customer, typically referred to as a drop wire, and support the load of the drop wire onto a support structure.

A variety of patents describe earlier efforts to provide such components. One such device shown in U.S. Pat. No. 4,438,293 (Vaser) uses a composite cable having a load carrier element made of a bundle of synthetic fibers, an overhead cable, a protective covering enclosing and uniting the load carrier element and the overhead cable. It further describes an end-loop formed from the load carrier element secured to it by a clamping element.

In U.S. Pat. No. 4,496,212 (Harvey), a fitting secures an overheard conductor. It further describes a fitting comprising a sleeve of malleable metal open at both ends and a termination having a tubular end for securing the fitting. One end of the sleeve is externally threaded and the tubular end of the termination is tapered and internally threaded. The sleeve surrounds the conductor and becomes compression jointed gripping the conductor when the fitting and termination are locked.

In U.S. Pat. No. 4,477,948 (Sachs), a device is described for holding a cable, with a support wire, suspended from a support. The device has an open-ended tubular member to securing the cable and an L-shaped slot captively retaining the support wire.

In U.S. Pat. No. 5,209,439 (Coll), there is disclosed a clamp having a trough and an apertured plate descending from one end of the trough so that the clamp can be suspended from a support. The trough is sized to accept a cable.

Each of these efforts to provide a satisfactory means of securing a drop wire has some inherent limitations. Some of these efforts use a solid tubular element which requires that the drop wire be threaded through the tube. This poses some installation concerns because the drop wire is ordinarily long and has to be supported intermediate its ends in an installation procedure which frequently occurs on a ladder other place of difficult access. One effort to avoid the time consuming and difficult threading process resulted in the Coll patent. However, that system requires that the support wire be wrapped around the trough, which is time consuming and difficult, especially when effected on a ladder or other inaccessible location.

SUMMARY OF THE INVENTION

Thus it is an objective of the present invention to provide a drop wire clamp that is inexpensive, reliable, simple to use and easy to install, rapidly and with simplicity. Specifically, the invention relates to a drop wire clamp for supporting a drop wire with an elongated helical spiral, shaped and sized to be threaded about the drop wire, and with a means for securing an end of the support wire to a fixed position.

In one embodiment, the invention relates to a drop wire clamp for securing and supporting a drop wire having a messenger strand and a support wire extending coextensively over a predetermined path. The clamp has an elongated helical spiral, having at least one coil, defining an elongated channel with a diameter greater than a diameter of the drop wire. The helical spiral has a pitch, minus a width of the coil, greater than the drop wire cable diameter. The clamp also has a means for engaging the support wire comprising of at least one anchor and a means for securing to a support structure.

In another embodiment, the invention relates to a drop wire clamp for supporting a drop wire comprising of a rigid segment connected to a malleable segment. The malleable segment comprises of an elongated member capable of conforming around the drop wire to form an elongated helical spiral around the drop wire.

The invention also relates to methods for securing a drop wire comprising placing the drop wire within an elongated channel defined by an elongated helical spiral of a drop wire clamp, securing the support wire to the drop wire clamp and securing the drop wire clamp with secured support wire to a support structure.

BRIEF DESCRIPTION OF THE DRAWINGS

Preferred, non-limiting embodiments of the present invention will be described with reference to the accompanying drawings, in which:

FIGS. 1a–f illustrate several views of a drop wire clamp embodying features of the present invention in which FIG. 1a is a perspective view, FIG. 1b is a top planar view, FIG. 1c is a front elevational view, FIG. 1d is a bottom plan view, FIG. 1e is a left end view and FIG. 1f is a right end view;

FIGS. 2a–f illustrate another embodiment of features of the present invention in which FIG. 2a is a perspective view, FIG. 2b is a top planar view, FIG. 2c is a front elevational view, FIG. 2d is a bottom plan view, FIG. 2e is a left end view and FIG. 2f is a right end view;

FIGS. 3a–b illustrate a modification of the drop wire clamp of FIG. 2 in which FIG. 3a is a top plan view and FIG. 3b is a front elevational view; and FIGS. 4a–b illustrate a further embodiment having a malleable segment from which a helical segment is formed in which FIG. 4a is a top plan view of a partially formed drop wire clamp and FIG. 4b is a perspective view of a partially formed drop wire clamp.

DETAILED DESCRIPTION OF THE INVENTION

Figure 1A:
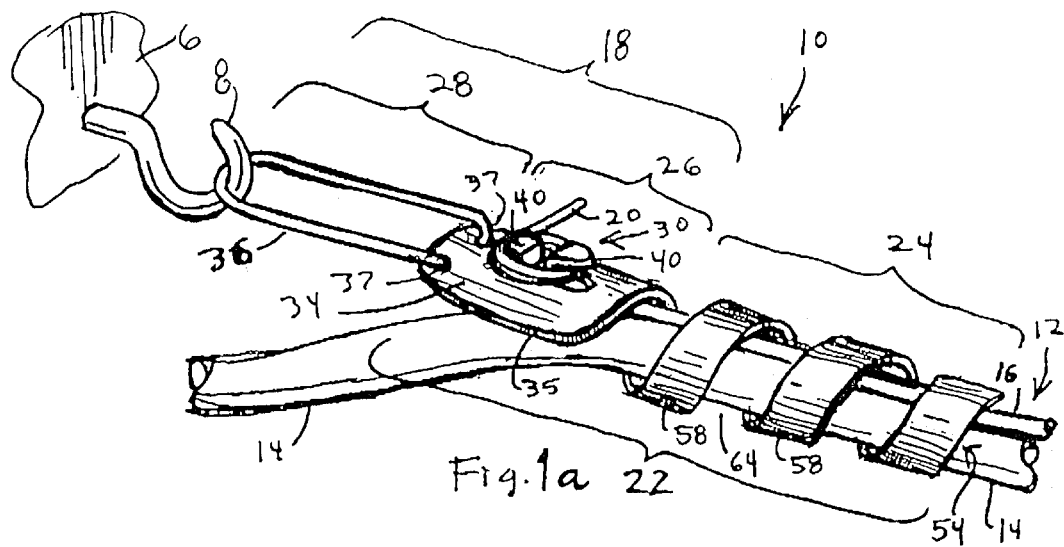

In the embodiment of FIGS. 1a to 1f, a drop wire clamp 10 for securing a drop wire 12 having a messenger strand 14 and a support wire 16 is shown. In particular, FIGS. 1a to 1f show suitable means 18 for securing an end 20 of the support wire 16 and suitable means 22 for supporting messenger strand 14.

Means 22 for supporting the messenger strand comprises of an elongated helical spiral 24 defining the outer surface of a channel 54 and having at least one coil 58. Messenger strand 14 and support wire 16 extend co-extensively over a predetermined path, at least through channel 54, and are supported in operative relation to an extension of the helical spiral 24. The elongated helical spiral has a pitch 62 between corresponding points of adjacent coils equal to the diameter of the drop wire 12 and the width of a coil 58. The clamp, with secured drop wire, may be secured to a support structure 6 by hook 8 attached to the support structure so that at least part of the load of the drop wire is carried by the support structure.

As depicted in FIG. 1*a*, the elongated helical spiral is cylindrical and so is channel 54. However, in some instances, the helical spiral 24 may be conical and so may corresponding channel 54. The shape of the helical spiral, and corresponding channel 54, may be designed according to the drop wire requirements and by such considerations as cost of construction, reliability or ease of installation.

The coils of the elongated helical spiral have a width 60. A larger number of coils increases the length of channel 54 which increases the support for the support wire and the messenger strand and also may limit further unwanted movement. Thus, in one embodiment, helical spiral 24 has at least one coil and preferably at least two or three coils.

The elongated member from which the coil is formed may have a variety of cross-sectional geometrical shapes. For example, the member may have a circular cross-section, an elliptical cross-section or a semi-circular or half-moon cross-section. In yet another embodiment, the coil may have rectangular cross-section. In the embodiment illustrated, the elongated helical spiral may be formed of flat stock and may be wound so that the inner surface of the elongated helical spiral has a flat surface and defines the elongated channel 54 with uniform constant diameter. This arrangement avoids stress points that would crimp or pinch the drop wire at a localized region. In another embodiment, the coils may be formed with a cross-section having a rounded or curved surface and an opposite flat surface.

Figure 1B:
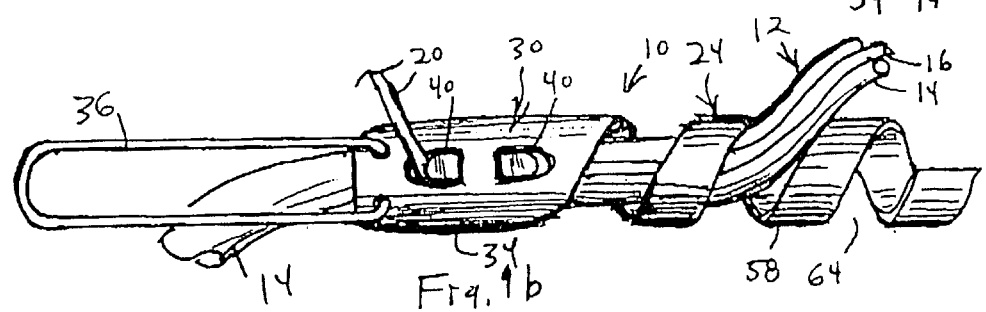

As illustrated in FIGS. 1*a* to 1*f*, the pitch of the helical spiral includes openings 64 between adjacent coils preferably slightly larger than the diameter of the drop wire. In the embodiment of FIGS. 1*a* to 1*f*, the drop wire may be inserted into the channel through one end of the channel or by weaving the drop wire through the openings between the coils without stretching or distorting the coils. However, if the helical spiral is a tightly wound spring wherein the pitch equals the diameter of the coils so that each coil touches the adjacent coil along its length, the drop wire may be placed into the elongated channel by insertion through the open end of the channel or by stretching the helical spiral to increase the pitch and enlarge openings between adjacent coils to a size greater than the diameter of the drop wire and weaving or threading the drop wire through the enlarged openings. As shown in FIG. 1*b*, the drop wire is placed into channel 54 by enlarging successive openings 64, by stretching or twisting the coils 58, while placing the drop wire therethrough. If the channel is sized smaller than the drop wire, the elongated channel may be slightly enlarged by distorting or twisting each coil to enlarge the diameter of the channel so that the drop wire may be inserted.

Figure 1C:
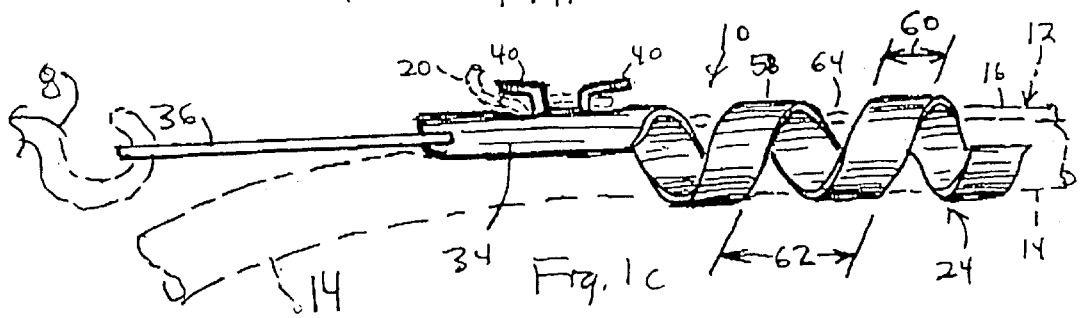
Figure 1D:
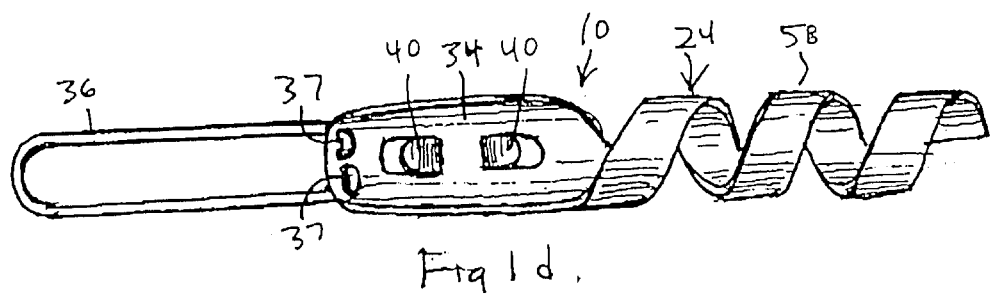
Figure 1E:
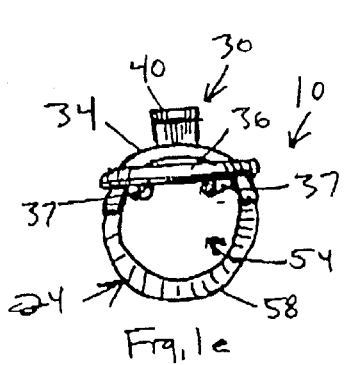
Figure 1F:
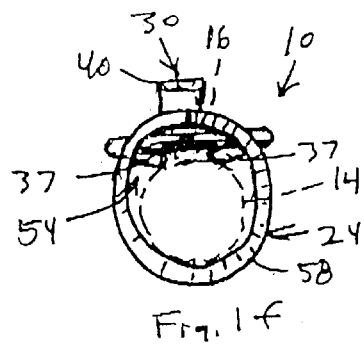
Figure 2A:
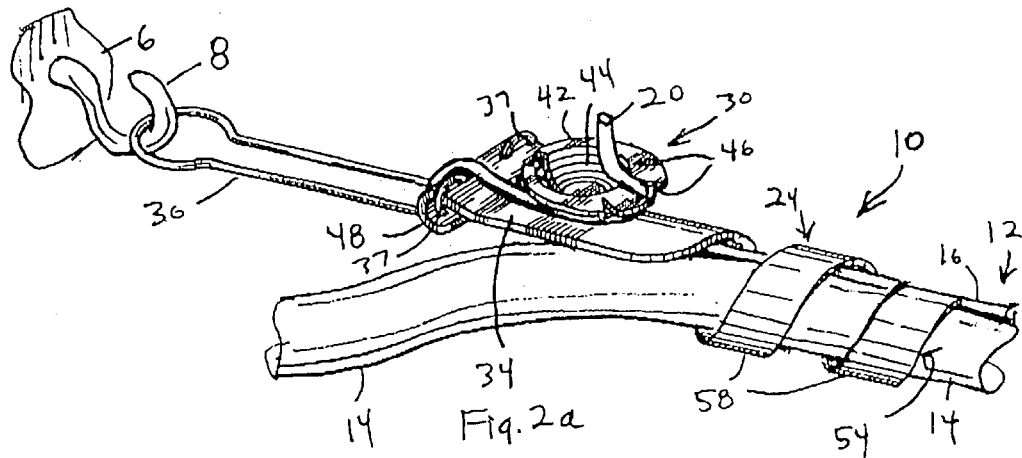
Figure 2B:
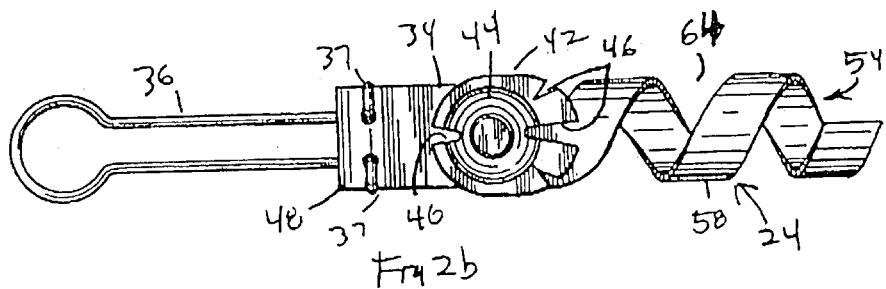
Figure 2C:
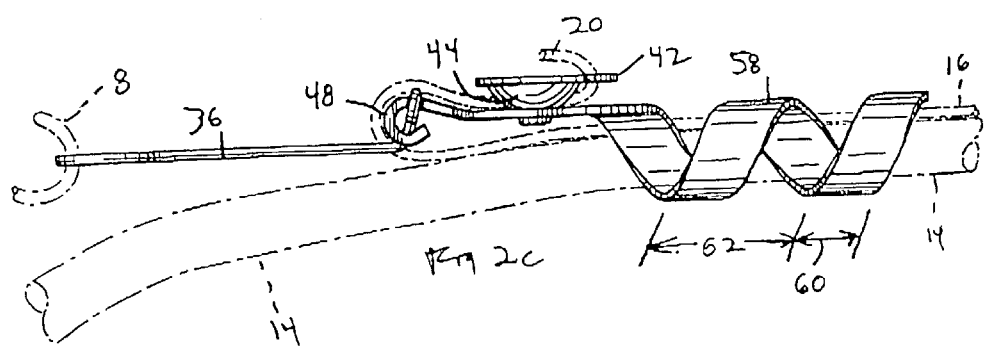

In FIGS. 1*a* to 1*f*, means 26 for securing the support wire comprises a flange 34 and at least one anchor 30 for securing an end 20 of the support wire. Flange 34 is integrally formed with and is an extension of the elongated helical spiral 24. The flange 34 lies in a plane substantially parallel to the axis of the length of the helical spiral. Flange 34 is wide enough to support the anchor 30. Flange 34 may be provided a curved longitudinal edge 35 that generally follows the contour of the elongated channel formed by the helical spiral. The anchor 30 may comprise of a pair of hook tabs or dog ears 40 which are preferably die cut or stamped from the body of flange 34 leaving an opening beneath the hook tabs 40. The hook tabs 40 may be configured in a number of arrangements to secure the supporting wire. They may have varying shapes and sizes provided they have an undercut portion sufficient to engage the support wire when wrapped about them. One or more of such support hook tabs 40 may be provided in a variety of arrangements. Preferably, however, two of such hook tabs as illustrated in FIGS. 1*a* to 1*f* are provided. In this arrangement, the hook tabs 40 are bent in opposite directions so as to provide a stanchion-like engaging member to permit the support wire to be wrapped around the hook tabs 40 as best illustrated in FIGS. 1*a* and 1*c*.

In the preferred embodiment of FIGS. 1*a* to 1*f*, means 28, for interfacing and securing the clamp to a support structure 6 and for and transferring at least part of the load of the clamp to the structure 6, comprises a U-shaped bail 36 with ends 37 hooked through openings in and locked to the flange 34. The bail 36 may be of any conventional form. This bail is generally U-shaped in configuration with an opening sufficiently large to engage a supporting element which is conventionally used to support or secure drop wire clamps. The particular configuration and shape of the bail may vary in forms well known in the art.

In using the drop wire clamp illustrated in FIGS. 1*a* to 1*f*, the installer will conventionally inter-engage the drop wire with the drop wire clamp by threading the clamp onto the wire. This may be done by rotating the helix of the clamp over the combination support wire and messenger wire of the drop wire. The free end of the messenger wire is then suitably engaged with the electrical units (not part of this invention) for which the drop wire is intended. The support wire 16 is then inter-engaged with the anchor 30. This may be achieved by cutting the end of the support wire to a length sufficient to permit its free end to be wrapped about the hook tabs 40 underneath the bent over upper portions so as to rigidly inter-engage the free end of the support wire with the hook tabs 40 of the drop wire clamp.

Modifications of the invention are illustrated in FIG. 2*a* to 2*f*. In FIGS. 2*a* to 2*f*, commonly numbered portions of the drop wire clamp are similar in construction and function to the corresponding numbers of the embodiment described in FIGS. 1*a* to 1*f*. In FIGS. 2*a* to 2*f*, the flange 34 is modified to provide a curved forward end 48 which is rolled over at least 180° and preferably more. The bail 36 is inter-engaged with the flange 34 by passing the free ends of the bail through openings in the flange and bending the free ends 37 over to permanently lock the bail to the flange. The bail illustrated in FIGS. 2*a* to 2*f* may have a somewhat different shape than the bail as illustrated in FIGS. 1*a* to 1*f* and in this instance, may be provided with a generally keyhole shaped configuration.

The mechanism or anchor 30 for securing the support wire to the drop wire clamp in the embodiment of FIGS. 2*a* to 2*f* includes a disk or washer-like element 42 that is secured to the upper side of the clamp body as illustrated. This washer-like element 42 includes a concave base 44 that is riveted, welded or otherwise permanently secured to flange 34. The washer-like element 42 lies essentially in a parallel plane to the flange 34, thus providing a space between the washer-like element 42 and flange 34. This space should be sufficiently wide to permit the end of a support wire 16 to be wrapped about the base 44 at least once and preferably several times. This configuration, in combination with the curved front end 48, provides a mechanism about which the support wire 16 may be bent and secured in place. In this configuration, the support wire extends through the helical coil, separates from the messenger wire, and is bent back over the curved front end 48, with its end wrapped about and secured to the washer-like element 42. By centrally locating the washer one the flange 34, the support wire may be bent rearwardly over the curved front end 48 and systematically secured to the washer. In a preferred form, the washer-like element 42 may be provided with a series of notches 46 which provide additional locking means for the ends of the support wire when the end of the support wire is engaged by at least one of the notches 46.

In yet another embodiment shown in FIGS. 3a to 3b, the clamp may have an aperture 38 in flange 34 for engaging with a hook 8 on the support structure 6. Aperture 38 may have a chamfered or curved inner wall 52 upon which the support wire may bear so as to reduce the likelihood of undesirable damage to the support wire.

Figure 4A:
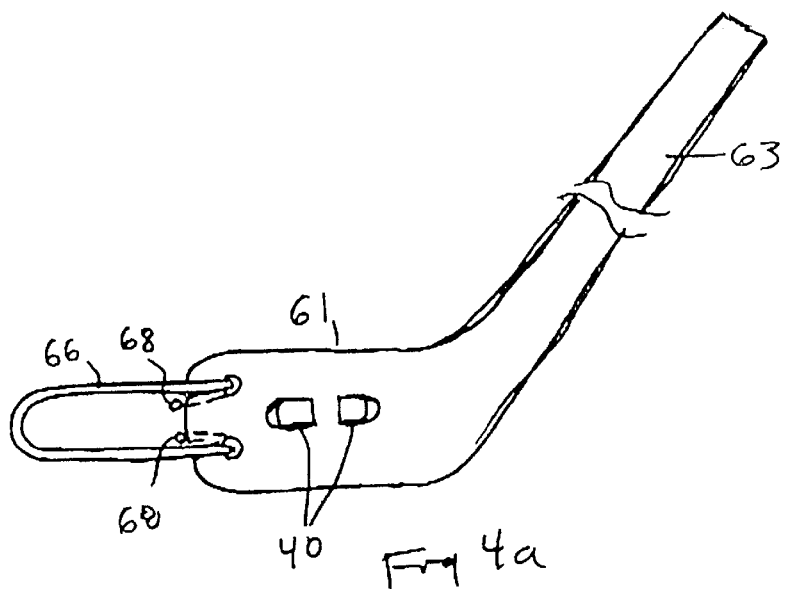
Figure 4B:
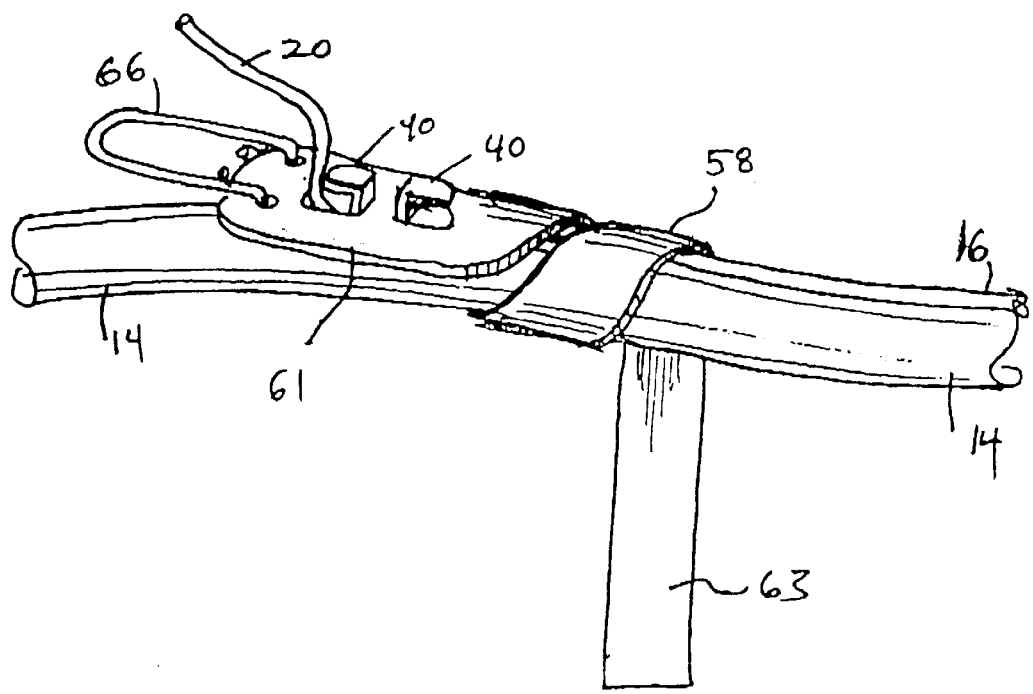

The embodiment of FIGS. 4a to 4b illustrates a drop wire clamp that may be shaped and formed on the job at the time of installation. In this configuration, the drop wire clamp is made of a flat stamped stock of malleable metal capable of being rolled or coiled on the job under hand pressure or, if necessary, under tool pressure. The drop wire clamp illustrated in FIGS. 4a to 4b includes a flange 61 and elongated tail or body 63 integrally formed with the flange 61. A conventional bail 66 has a pair of legs which are inter-engaged with the flange 61 by passing the ends of the legs of the bail 66 through openings in the flange 61 and bending the ends over to form interlocks 68. The flange is also provided with a pair of hook tabs 40 similar to those illustrated and described in connection with FIGS. 1a to 1f. To this extent, the design of the embodiment of FIGS. 4a to 4b is similar to the embodiment of FIG. 1. However, the tail 63 extending at an angle from the flange 61 is formed of a width and length sufficient to permit it to be rolled about the drop wire into a helix on the job, the helix thus formed similar in shape and configuration to the helix of FIG. 1. In this instance however, since the tail 63 is wrapped about the drop wire in situ, rather than being pre-formed, the helix may be formed with a pitch of substantially any desired distance. Thus in the embodiment of FIGS. 4a to 4b, the helix may be formed with the edges of the coils touching or overlapping one another.

Other embodiments of a drop wire clamp similar to that of FIG. 4 are contemplated in which the flange and its attached components have a variety of shapes and sizes generally suggested by the embodiments of FIGS. 2 and 3.

The drop wire clamp may be made of a variety of materials, but preferably should be made of steel or aluminum material, taking into consideration the particular purpose for which the specific drop wire clamp is needed. The clamp, however, should have sufficient load-bearing capability to support the particular system for which it is designed.

The invention also contemplates the use of a helical spiral formed of a spring of steel which has a normal helical spring configuration with abutting coils when not distended. In this arrangement, the coils may be stretched to permit the helix to be threaded by stretching the coils over the drop wire. When the drop wire is fully inserted and the helix is relaxed, it will return to essentially a solid form.

Further modification and equivalents to the invention herein disclosed will occur to persons skilled in the art using no more than routine experimentation, and all such modifications and equivalents are believed to be within the spirit and scope of the invention as defined by the following claims.

What is claimed is:

1. A drop wire clamp for supporting a messenger strand and securing a support wire comprising:
    a first means for securing an end of the support wire to a fixed position; and
    means for supporting the messenger strand in operative relation to the first means comprising an elongated helical spiral shaped and sized to be threaded about the messenger strand.

2. The drop wire clamp of claim 1 wherein the first means for securing the end of the support wire comprises an anchor attached to the drop wire clamp.

3. The drop wire clamp of claim 1, wherein thee spiral is formed from a substantially rigid material constructed and adapted to support the messenger strand in a substantially horizontal configuration.

4. A drop wire clamp for securing and supporting a drop wire having a messenger strand and a support wire extending co-extensively over a predetermined path comprising:
    an elongated helical spiral having at least one coil defining an elongated channel with a diameter greater than a diameter of the drop wire and with a pitch minus a width of the coil greater than the drop wire cable diameter; and
    a means for securing an end of the support wire.

5. The clamp of claim 4 wherein the means for engaging the support wire comprises an anchor attached to the drop wire clamp.

6. The clamp of claim 4, wherein the spiral is formed from a substantially rigid material constructed and adapted to support the messenger strand in a substantially horizontal configuration.

7. A load bearing drop wire clamp for supporting a drop wire to a structure, the drop wire having a messenger strand and a support wire, the drop wire clamp comprising:
    an elongated helical spiral defining an elongated channel sized and shaped to receive a segment of the drop wire therethrough; and
    means for securing an end of the support wire to the drop wire clamp with the messenger strand extending therefrom and with the drop wire clamp having means for securing the drop wire clamp to a fixed structure whereby a load of the messenger strand is in part supported by the engagement of the drop wire and the drop wire clamp.

8. The clamp of claim 7, wherein the spiral is formed from a substantially rigid material constructed and adapted to support the messenger strand in a substantially horizontal configuration.

9. A drop wire clamp for supporting a drop wire having a messenger strand and a support wire comprising:
    an elongated helical spiral having at least one coil defining an elongated channel sized and shaped to accept a coextending segment of the drop wire;
    a flange attached to the elongated helical spiral and positioned on a pane substantially parallel to the elongated channel;
    an anchor disposed on the flange; and
    a bail with ends attached to the flange.

10. The drop wire clamp of claim 9 wherein the elongated helical spiral further having a pitch between adjacent coils.

11. The drop wire clamp of claim 10 wherein the elongated helical spiral further comprises an opening between adjacent spirals.

12. The drop wire clamp of claim 10 wherein the anchor comprises at least one disk having a base and at least one notch along a perimeter of the disk.

13. The clamp of claim 9, wherein the spiral is formed from a substantially rigid material constructed and adapted to support the messenger strand in a substantially horizontal configuration.

14. A method for supporting a weight of a load of a messenger strand running coextensively with a support wire of a drop wire comprising:

loading the support wire with at least part of the load of the messenger strand;

transferring at least part of the load of the support wire to a drop wire clamp by placing a segment of the support wire into an elongated channel defined by an elongated helical spiral on the drop wire clamp and fastening an end of the support wire to an anchor on the drop wire clamp; and attaching the loaded drop wire clamp to a supporting structure.

15. The method of claim 14 wherein placing the drop wire within the elongated channel comprises inserting an end of the drop wire into an open end of the elongated channel and pulling the drop wire through the channel.

16. The method of claim 14 wherein placing the support wire within the elongated channel comprises weaving a segment of the drop wire through openings between coils of the elongated helical spiral.

17. The method of claim 16 further comprising stretching the elongated helical spiral to expand the openings between adjacent coils.

18. The clamp of claim 14, wherein transferring at least part of the load of the support wire to drop wire clamp includes supporting at least a portion of the support wire in a substantially horizontal configuration.

19. A drop wire clamp for supporting a drop wire having a messenger strand and a support wire comprising:

a rigid segment attached to a malleable segment capable of being shaped around the drop wire to form an elongated helical spiral around the drop wire;

a means for securing an end the support wire to the drop wire clamp; and a means for securing the drop wire clamp to a supporting structure.

20. The drop wire of claim 19 wherein the means for securing the support wire comprises an anchor attached to the rigid segment.

21. The drop wire clamp of claim 19, wherein the spiral is formed from a rigid and malleable material constructed and adapted to support the messenger strand in a substantially horizontal configuration.

22. A method for supporting a messenger strand and a support wire comprising:

winding a malleable segment of a drop wire clamp around the support wire;

attaching and securing an end of the support wire to an anchor affixed to the drop wire clamp; and securing the drop wire clamp with attached support wire to a support structure.

23. A drop wire clamp for supporting a messenger strand and securing a support wire comprising:

a first means for securing an end of the support wire to a fixed position comprising a washer on a clamp body; and a means for supporting the messenger strand in operative relation to the first means.

24. The drop wire clamp of claim 23, wherein means for supporting the messenger strand includes a rigid elongated helical spiral supporting at least a portion of the support wire in a substantially horizontal configuration.

* * * * *